United States Patent
Olsson et al.

(10) Patent No.: US 8,943,691 B2
(45) Date of Patent: Feb. 3, 2015

(54) FURCATED COMPOSITE POST

(76) Inventors: Ashley Dean Olsson, Goulburn (AU);
Ashley Norman Olsson, Goulburn (AU); Nathanael Dean Olsson, Goulburn (AU); Stafford James Olsson, Goulburn (AU)

(*) Notice: Subject to any disclaimer, the term of this patent is extended or adjusted under 35 U.S.C. 154(b) by 0 days.

(21) Appl. No.: 13/505,736

(22) PCT Filed: Nov. 2, 2010

(86) PCT No.: PCT/AU2010/001456
§ 371 (c)(1),
(2), (4) Date: Jul. 17, 2012

(87) PCT Pub. No.: WO2011/054034
PCT Pub. Date: May 12, 2011

(65) Prior Publication Data
US 2012/0280192 A1 Nov. 8, 2012

(30) Foreign Application Priority Data
Nov. 3, 2009 (AU) ................................. 2009905360

(51) Int. Cl.
*B21D 51/16* (2006.01)
*B21K 1/16* (2006.01)
(Continued)

(52) U.S. Cl.
CPC ............... *B23K 31/022* (2013.01); *B21H 7/00* (2013.01); *B23K 9/0256* (2013.01); *B23K 9/173* (2013.01);
(Continued)

(58) Field of Classification Search
CPC .... B29C 65/00; B29C 65/02; B29C 65/5057; B29C 66/11; B29C 66/22; B29C 66/534; B29C 66/1142; B29C 37/04; B21D 3/16; B29L 2031/73; B23K 26/345
USPC ............ 52/848, 831, 719; 29/897.33, 897.35, 29/897.3, 897.31, 898, 890.148, 402.07, 29/898.056; 403/232.1; 256/48, 50; 228/173.4, 173.5, 155, 158, 5.1
See application file for complete search history.

(56) References Cited

U.S. PATENT DOCUMENTS 3,192,079 A * 6/1965 Takagi et al. .................. 148/500
3,432,915 A * 3/1969 Doyle ........................... 228/216
(Continued)

FOREIGN PATENT DOCUMENTS

| CN | 1032691 | 5/1989 |
| CN | 2496570 | 6/2002 |

(Continued)

OTHER PUBLICATIONS

English Translation of Japanese Patent Publication JP 2000-328713 to Kawaski Steel Co., Nov. 28, 2000.
(Continued)

*Primary Examiner* — Chi Q Nguyen
(74) *Attorney, Agent, or Firm* — Byrne Poh LLP

(57) ABSTRACT

A method of manufacturing a furcated composite post (1) comprising at least two strips (7, 8) that are joined together along their length in a furcated manner. The method comprises the steps of feeding one or more of the strips (7, 8) at a set rate to working rolls of a roll mill for profile rolling to a desired cross section/profile, feeding the strips (7, 8) at the same set rate to positioning rolls for holding the strips (7, 8) in a correct orientation for joining, and joining the strips together, preferably by welding the strips (7, 8) along their length.

18 Claims, 11 Drawing Sheets

(51) Int. Cl.
*B23P 17/00* (2006.01)
*B23K 31/02* (2006.01)
*B21H 7/00* (2006.01)
*B23K 9/025* (2006.01)
*B23K 9/173* (2006.01)
*B23K 11/00* (2006.01)
*E04H 17/20* (2006.01)

(52) U.S. Cl.
CPC .............. *B23K 11/002* (2013.01); *E04H 17/20* (2013.01); *B23K 2201/28* (2013.01); *B23K 2201/34* (2013.01); *B23K 2203/04* (2013.01)
USPC ................... 29/890.148; 29/402.07; 29/898; 29/898.056; 52/848; 228/173.4; 228/173.5; 228/155; 228/158

(56) References Cited

U.S. PATENT DOCUMENTS

| | | | |
|---|---|---|---|
| 3,746,827 A | | 7/1973 | Martin et al. |
| 3,832,523 A | * | 8/1974 | Kitani et al. ............... 219/137 R |
| 3,882,654 A | * | 5/1975 | Yancey .......................... 403/271 |
| 4,377,732 A | * | 3/1983 | Preller .......................... 219/608 |
| 6,770,834 B1 | * | 8/2004 | Deshotel .................... 219/78.16 |
| 7,175,893 B2 | * | 2/2007 | Coats et al. ................... 428/34.9 |
| 7,389,586 B2 | * | 6/2008 | Patberg ........................ 29/897.2 |
| 7,921,562 B2 | * | 4/2011 | Kiji et al. ........................ 29/897 |
| 8,122,672 B2 | * | 2/2012 | Houghton et al. ........... 52/656.9 |
| 2009/0246738 A1 | | 10/2009 | Karmaker |
| 2010/0043347 A1 | * | 2/2010 | Houghton et al. .............. 52/831 |
| 2011/0308197 A1 | * | 12/2011 | Wallace .......................... 52/846 |
| 2012/0328898 A1 | * | 12/2012 | Strickland et al. ............. 428/594 |

FOREIGN PATENT DOCUMENTS

| | | |
|---|---|---|
| JP | 2000328713 A | 11/2000 |
| WO | WO/95/29313 | 11/1995 |
| WO | WO/99/47284 | 9/1999 |

OTHER PUBLICATIONS

Internation Search Report in Related PCT Application No. PCT/AU2010/001456, Jan. 7, 2011.
Written Opinion in Related PCT Application No. PCT/AU2010/001456, Jan. 7, 2011.
International Preliminary Report on Patentability dated Jan. 25, 2013 in International Patent Application No. PCT/AU2012/000727.
International Preliminary Report on Patentability dated May 8, 2012 in International Patent Application No. PCT/AU2010/001456.
International Search Report dated Dec. 27, 2012 in International Patent Application No. PCT/AU2012/000727.
Office Action dated Dec. 11, 2013 in Chinese Patent Application No. 201080054940.9.
Written Opinion dated Sep. 20, 2012 in International Patent Application No. PCT/AU2012/000727.

* cited by examiner

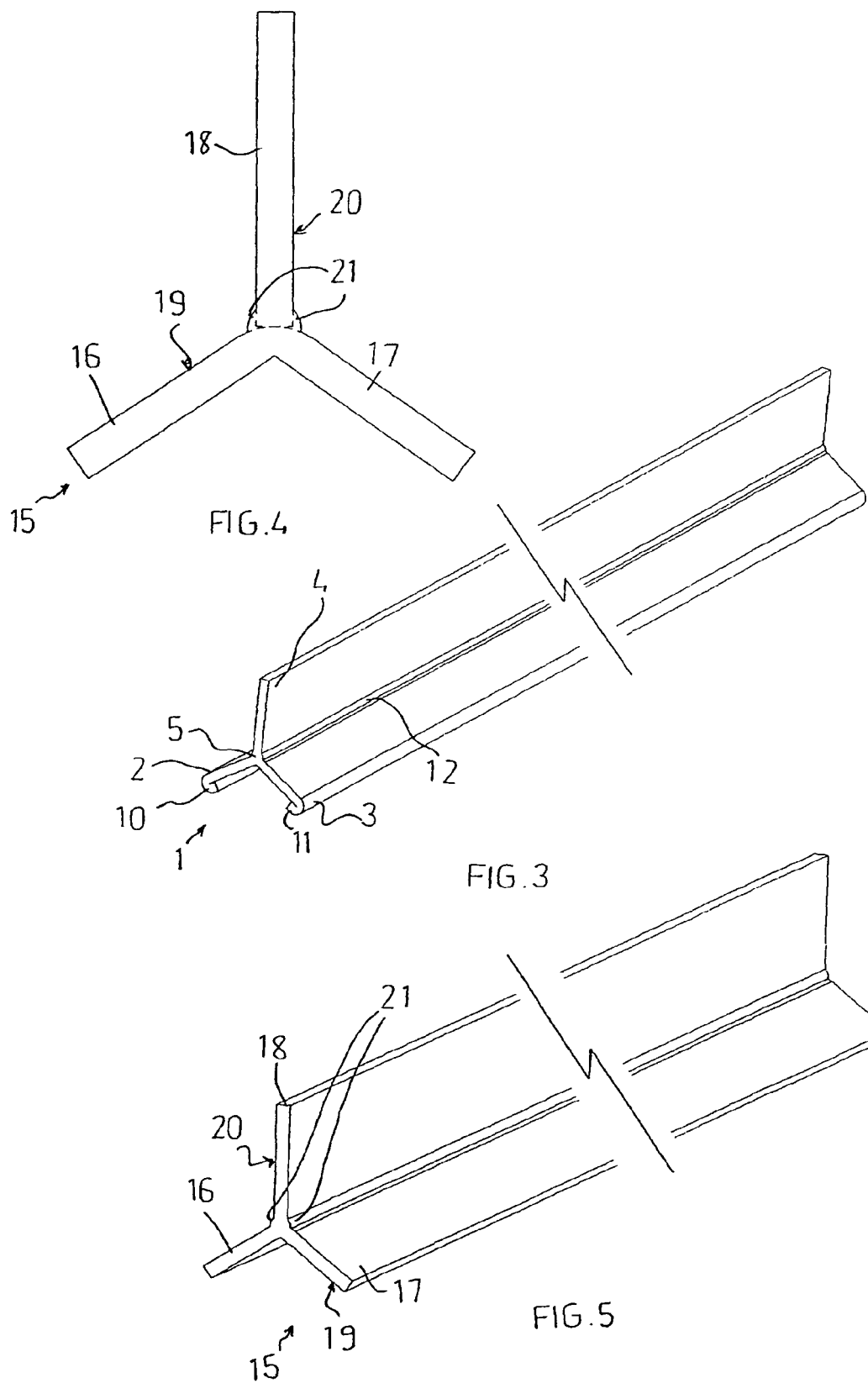

FURCATED COMPOSITE POST

TECHNICAL FIELD

This invention relates to a furcated composite post manufactured from at least two strips that are joined together along their length in a furcated manner.

BACKGROUND ART

Known processes for manufacturing furcated steel posts suffer from one or more of the following disadvantages:

- A high rate of post production is difficult and expensive.
- Smaller quantities of posts cannot be produced in a highly cost effective manner.
- The application of an anti-corrosion coating (or other anti-corrosion measure) is not possible until after a naïve post has been manufactured.
- The process many not allow for the incorporation of post-cutting and hole-punching steps until after a naïve post has been manufactured.
- There is inefficient use of steel as, due to the manufacturing process, the arms of the post must necessarily be tapered—as opposed to the arms not being tapered at their free ends.
- The use of different grades of steel in the one finished product is not possible.

DISCLOSURE OF INVENTION

An object of the present invention is to provide a manufacturing technique or furcate composite post that overcomes or minimises one or more of the disadvantages referred to above.

Another object of the present invention is to provide the public with a useful or commercial post choice.

Broadly, the invention concerns a furcated composite post manufactured from at least two strips that are joined together along their length in a furcated manner.

The strips may be joined together along their length in a furcated manner in any suitable way. In one aspect, two or three metal/metal alloy strips are joined together along their length in a furcated manner to provide at least three interconnected generally radially extending arms. In another aspect, two metal/metal alloy strips are joined together along their length in a furcated manner to provide a longitudinally extending tube and arms extending generally radially there from.

According to a first aspect of the present invention, there is provided a furcated composite post comprising:

a longitudinal axis; and
at least three interconnected arms, each of which extends along the longitudinal axis and generally radially from the longitudinal axis,
wherein the at least three interconnected arms are provided by at least two strips that are joined together along their length to form the post.

The three interconnected arms of the post may be provided by two strips. That is; two arms may be provided by the one strip. Alternatively, the three arms may be provided by three strips. That is, each arm may be provided by a separate strip. If the post is to have more than three arms, then those arms may be provided by two or more strips.

Each strip may be of any suitable size and shape, and may be made of any suitable material or materials. Preferably each strip is made of metal/metal alloy, such as steel, steel alloy, stainless steel, coated steel, anodised steel, galvanised or ungalvanised steel.

Each strip may be of any suitable width, length and thickness. This will depend on the post strength required as well as the length and width of arms required. In a preferred embodiment, each strip has a thickness of about 1-10 mm, although a thickness of about 1.5-4 mm is preferred, particularly if the strip is to be subjected to profile rolling.

Preferably, the strips provide a post with each arm being approximately 1 m to 3 m in length, 10 mm to 40 mm in width, and 1.5 mm to 4.0 mm in thickness. However, larger and smaller dimensions are envisaged as well. Each arm may be of varying length, width and thickness.

The post may have any suitable profile/cross-section. In one embodiment the post is bifurcated whereas in another embodiment the post is trifurcated. The post may be substantially T-shaped or Y-shaped when viewed on end. The arms may extend linearly or other than linearly when viewed on end. The arms may be shaped to provide the post with additional strength. The arms may have folds, ribs, bends or rolled-over longitudinal ends to help the post resist bending when being driven into the ground or when being forced from a normal vertical attitude by a large animal, such as a horse or cow.

Preferably, the post is generally Y-shaped when viewed on end, and the angle between two upstretched arms of the 'Y' is between about 80 to 130 degrees.

One or more arms of the post may have one or more openings spaced along a length of the arm for retaining fencing members, such as fencing wire. A fencing wire may be threaded through each opening. Alternatively, each opening may be in the form of a slot for retaining a fencing wire.

Alternatively or additionally, the post may comprise keepers for fencing members as described in the applicants' co-pending applications numbered PCT/AU2008/000856, PCT/AU2008/000857 and PCT/AU2009/001316—the entire contents of which are incorporated herein by cross-reference.

The post may comprise a pointed base that may be driven into the ground.

According to a second aspect of the present invention, there is provided a furcated composite post comprising:

a longitudinal axis;
a tube extending along the longitudinal axis; and
at least two arms extending along the tube and generally radially from the tube,
wherein the tube and arms are provided by at least two strips that are joined together along length to form the post.

Preferably, the tube and arms are provided by two strips.

Each strip may be of any suitable size and shape, and may be made of any suitable material or materials. Preferably each strip is made of metal/metal alloy, such as steel, steel alloy, stainless steel, coated steel, anodised steel, galvanised or ungalvanised steel.

Each strip may be of any suitable width, length and thickness. This will depend on the post strength required as well as the length and width of tube and arms required. In a preferred embodiment, each strip has a thickness of about 1-10 mm, although a thickness of about 1.5-4.0 mm is preferred, particularly if the strip is to be subjected to profile rolling.

Preferably, the strips provide a post with each arm being approximately 1 m to 3 m in length, 10 mm to 40 mm in width, and 1.5 mm to 4.0 mm in thickness. Preferably; the strips provide a post with the tube being approximately 10 mm to 100 mm in width, and 1.5 mm to 4.0 mm in thickness. However, larger and smaller dimensions for the arms and tube are envisaged as well. Each arm may be of varying length, width and thickness.

The post may have any suitable profile/cross-section. The tube may be of any suitable cross section, eg. circular, triangular or rectangular. The arms may extend linearly or other than linearly when viewed on end. The arms may be shaped to provide the post with additional strength. The arms may have folds, ribs, bends or rolled-over longitudinal ends to help the post resist bending when being driven into the ground or when being forced from a normal vertical attitude by a large animal, such as a horse or cow.

Preferably, the tube is generally rectangular when viewed on end, and the arms extend radially from opposed corners of the tube.

One or more arms of the post may have one or more openings spaced along a length of the arm for retaining fencing members, such as fencing wire. A fencing wire may be threaded through each opening. Alternatively, each opening may be in the form of a slot for retaining a fencing wire.

Alternatively or additionally, the post may comprise keepers for fencing members as described in the applicants' co-pending applications numbered PCT/AU2008/000856, PCT/AU2008/000857 and PCT/AU2009/001316—the entire contents of which are incorporated herein by cross-reference.

The post may comprise a pointed base that may be driven into the ground.

The invention also broadly concerns a method of manufacturing a furcated composite post, said method comprising the step of joining at least two strips together along their length so as to form a furcated composite post.

The post may be as described according to the first or second aspect of the invention.

According to a third aspect of the present invention, there is provided a method of manufacturing a furcated composite post, said method comprising the step of joining at least two strips together along their length so as to form a furcated post comprising:
 a longitudinal axis; and
 at least three interconnected arms, each of which extends along the longitudinal axis and generally radially from the longitudinal axis.

The post manufactured according to the third aspect may be as described in respect of the first aspect of the invention.

Any suitable manufacturing process may be used. Preferably, manufacturing involves profile rolling one or more. of the strips using a roll mill, and more preferably cold profile rolling. However, hot profile rolling may also be used.

A said strip requiring profile rolling may be fed at a set rate from a coil dispenser to a roll mill, and shaped to the appropriate cross section using one or more sets of working rolls of the mill.

Each strip, whether worked by the mill or not, may be fed at the same set rate to one or more positioning rolls of the mill such that the strips may be held in a correct orientation for joining.

The strips may be joined in any suitable way. Preferably, the strips are welded together manually or automatically at a welding station/line situated at the positioning rolls. High-frequency resistance, rotary spot and MIG welding are examples of suitable welding techniques.

The method may comprise the step of cutting the post to a desired final length or intermediate length for storage and transport. Cutting may be achieved in any suitable way. The roll mill may comprise a pre-cut die or a post-cut die for cutting the post to length. Similarly, the roll mill may comprise a pre-cut die or a post-cut die for forming the pointed ground anchoring base of the post.

The method may comprise the step of installing one or more openings in one or more arms of the post. This may be achieved in any suitable way. The roll mill may comprise a punch for punching openings in the strip. Punching may occur before roll forming starts, during roll forming or after roll forming has been completed.

The method may comprise the step of treating the strips or post so as to reduce or prevent corrosion. This may be achieved in any suitable way. For instance, the strips or post may be coated, plated or otherwise treated for corrosion prevention before roll forming starts, during roll forming or after roll forming has been completed.

According to a fourth aspect of the present invention, there is provided a method of manufacturing a furcated composite post, said method comprising the step of joining at least two strips together along their length so as to form a furcated post comprising:
 a longitudinal axis;
 a tube extending along the longitudinal axis; and
 at least two arms extending along the tube and generally radially from the tube,
 wherein the tube and arms are provided by at least two strips that are joined together along their length to form the post.

The post manufactured according to the fourth aspect may be as described in respect of the second aspect of the invention.

The method may be as described according to the third aspect of the invention.

According to a fifth aspect of the present invention, there is provided a roll mill for manufacturing a furcated composite post comprising at least two strips that are joined together along their length in a furcated manner, said mill comprising:
 working rolls for profile rolling at least one of the strips to a desired cross section/profile; and
 positioning rolls for holding the strips in a correct orientation for joining.

The furcated composite post may be as described according to the first and second aspects of the invention.

The roll mill may comprise a welding station for joining the two strips together The roll mill may comprise one or more coil dispensers for feeding one or more of the strips at a set rate to the working rolls.

The roll mill may comprise a cutting die for cutting the post to length.

The roll mill may comprise a cutting die for forming the pointed ground anchoring base of the post.

The roll mill may comprise a punch for punching openings in the strip.

According to a sixth aspect of the present invention, there is provided a method of manufacturing a furcated composite post, with said post comprising at least two strips that are joined together along their length in a furcated manner, said method comprising the steps of:
 (1) feeding one or more of the strips at a set rate to working rolls of a roll mill for profile rolling to a desired cross section/profile;
 (2) feeding the strips at the same set rate to positioning rolls for holding the strips in a correct orientation for joining; and
 (3) joining the strips together, preferably by welding the strips along their length.

Preferred embodiments of the invention will now be described by way of example with reference to the accompanying figures.

BRIEF DESCRIPTION OF THE FIGURES

FIG. 3 is a perspective view of the post (of indefinite length) shown in FIG. 2;

FIG. 4 is a detailed end view of two strips of a furcated composite post when connected together, according to another embodiment of the present invention;

FIG. 5 is a perspective view of the post (of indefinite length) shown in FIG. 4;

BEST MODES FOR CARRYING OUT THE INVENTION

Figure 2:
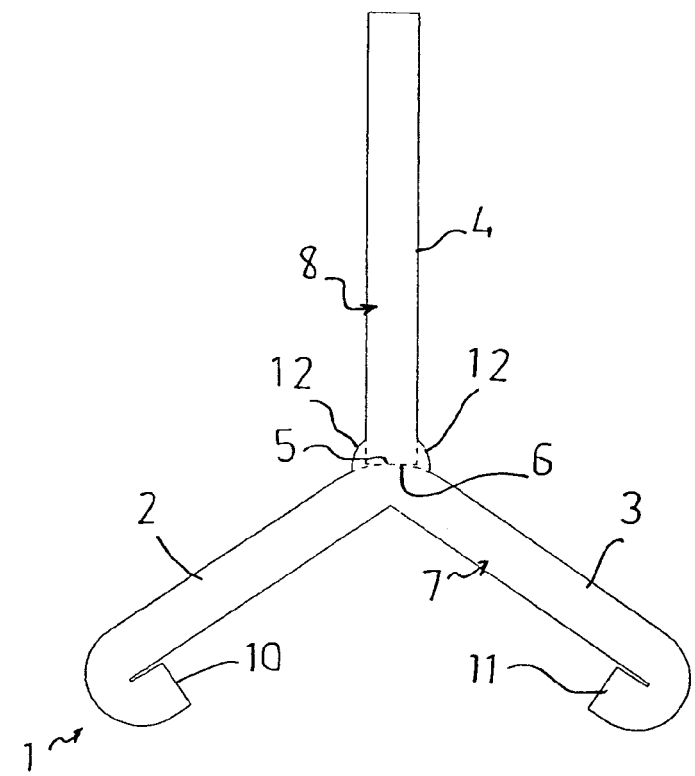
FIG. 2 is the same as FIG. 1 but showing in detail the strips joined together.

In the figures, like reference numerals refer to like features.

Figure 1:
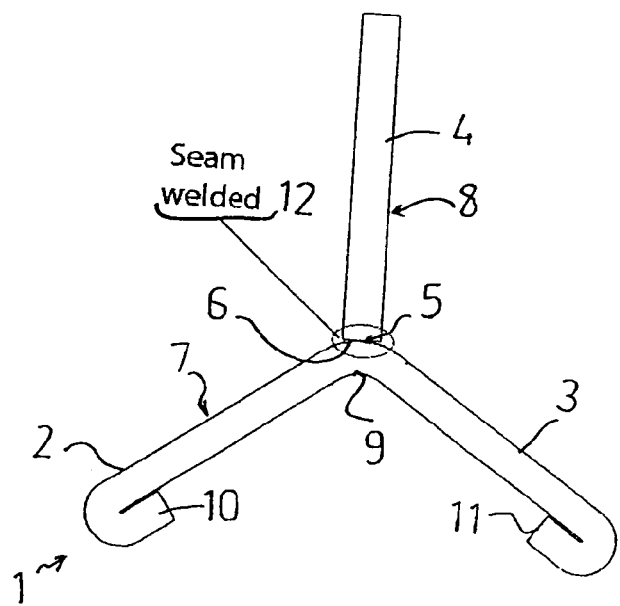
FIG. 1 is an end view of two separate strips of a furcated composite post, according to an embodiment of the present invention.
Figure 20:
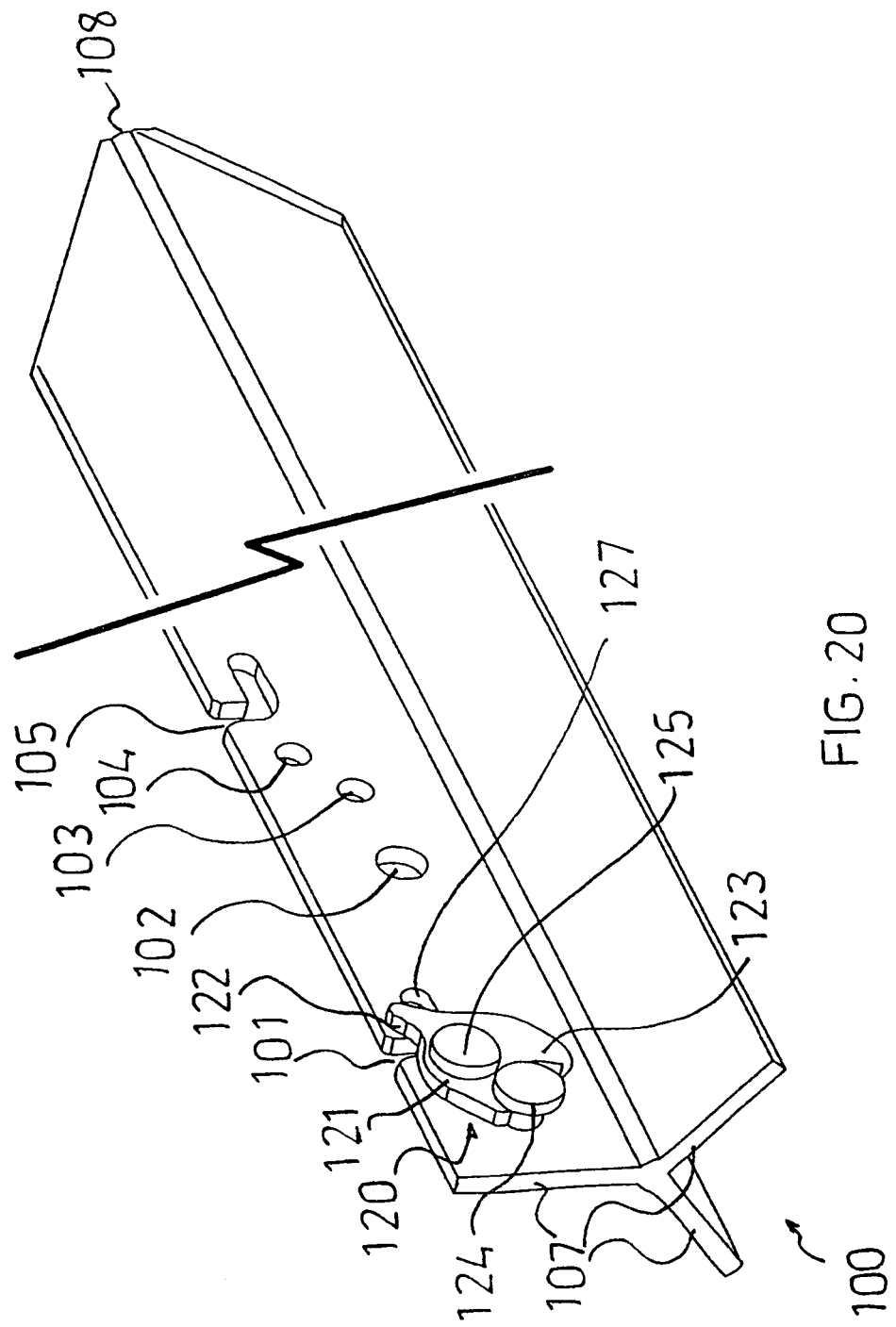
FIG. 20 is a general representation of a post like that of any one of FIGS. 1-12 and FIGS. 14-19, showing what types of openings one or more arms of the post may have and also showing a pointed ground anchoring end, according to an embodiment of the present invention.

Referring first to FIGS. 1-3, there is shown a furcated composite post 1 according to an embodiment of the present invention. The post 1 has a spine 5, a longitudinal axis extending along the spine 5 and three arms 2, 3, 4 that extend along a length of the spine 5 and generally radially from the spine 5. Arms 2 and 3 extend from the spine 5 at approximately 100-120 degrees relative to one another. Free longitudinal ends of arms 2 and 3 are rolled over 10, 11 and provide the post 1 with additional strength. That is, they increase the moment of inertia, helping the post 1 resist bending when being driven into the ground or when sideways pressure is exerted against the post after installation. Arm 4 may have openings spaced along a length of the arm 4 for retaining fencing wires and other types of fencing members (see FIG. 20). Although not shown in these figures, a ground anchoring end of the post 1 may be pointed (as seen in FIG. 20).

FIGS. 1 and 2 show that the post 1 is manufactured from two separate steel strips 7, 8 that are welded together. Strip 7 provides a bend 9 and arms 2 and 3 extend from each side of the bend 9. Strip 8 provides arm 4. A longitudinal end 6 of arm 4 is welded to the bend 9 along the spine 5. The weld seam is labelled numeral 12 and is barely visible in FIG. 3.

Manufacture of post 1 involves cold profile rolling strip 7 using a roll mill. In order to manufacture post 1, strip 7 (about 20-80 mm wide and about 2-5 mm thick) is unspooled from a coil dispenser at a set rate and fed to one or more sets of working rolls of the mill, until the V-shape profile with rolled-over ends 10, 11 is achieved.

Strip 8 is unspooled from a coil dispenser at the same set rate and together with strip 7 is fed through a set of positioning rollers of the roll mill such that the strips 7 and 8 are held in a correct orientation for joining by welding. The strips 7, 8 are then welded 12 together either manually or using an automated welding station.

The welded strips 7,8 are then cut to the required length using a die/flying shear system to form the post 1 or a longer intermediate post.

The post 1 may be further processed by way of being cut to produce a ground anchoring point. The post 1 may be hole- or slot-punched using a punch of the roll mill. The post 1 may be subjected to anti-corrosion techniques (eg. coated, plated, anodised etc).

Referring now to FIGS. 4 and 5, there is shown a furcated composite post 15 according to another embodiment of the present invention. The post 15 is essentially the same as post 1, except that none of its arms 16, 17, 18 have rolled-over ends.

FIG. 4 shows that the post 15 is manufactured from two separate steel strips 19, 20 that are welded together. The weld seam is labelled numeral 21.

Post 15 can be manufactured as described above for post 1.

Figure 6:
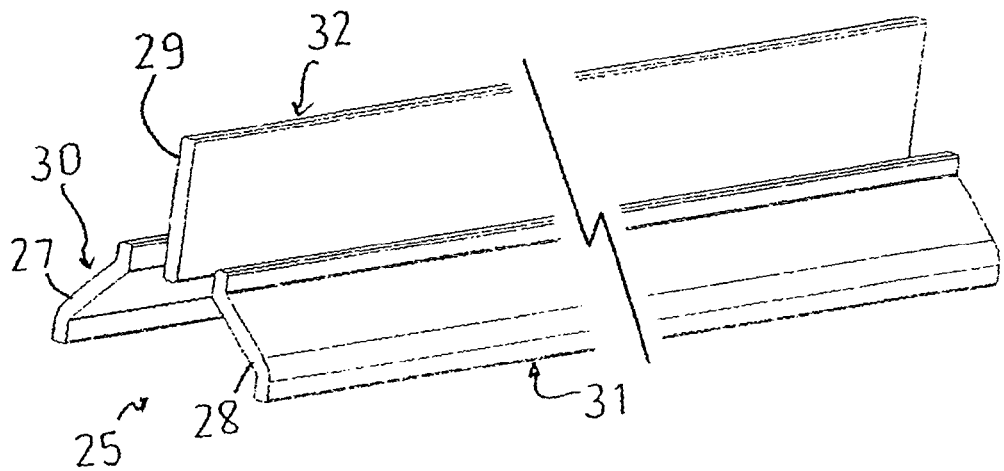
FIG. 6 is a perspective view of three separate strips of a furcated composite post (of indefinite length), according to another embodiment of the present invention.
Figure 7:
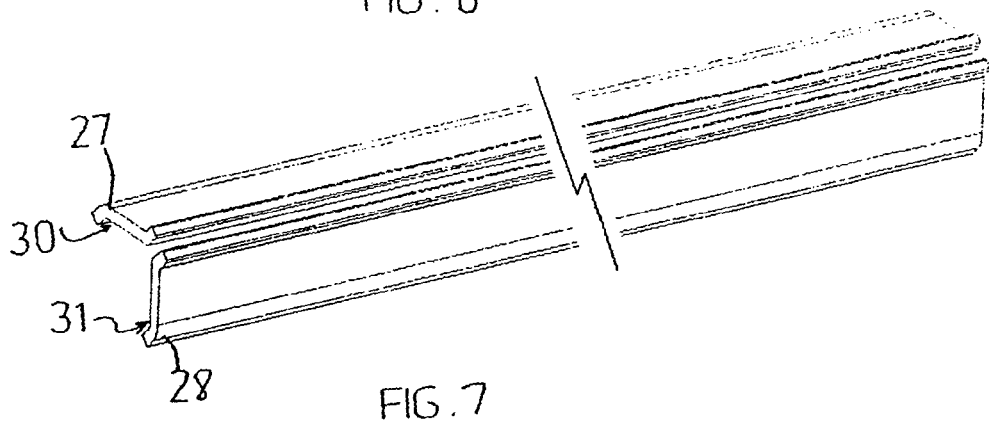
FIG. 7 is a perspective view of two separate strips of the post shown in FIG. 6.
Figure 8:
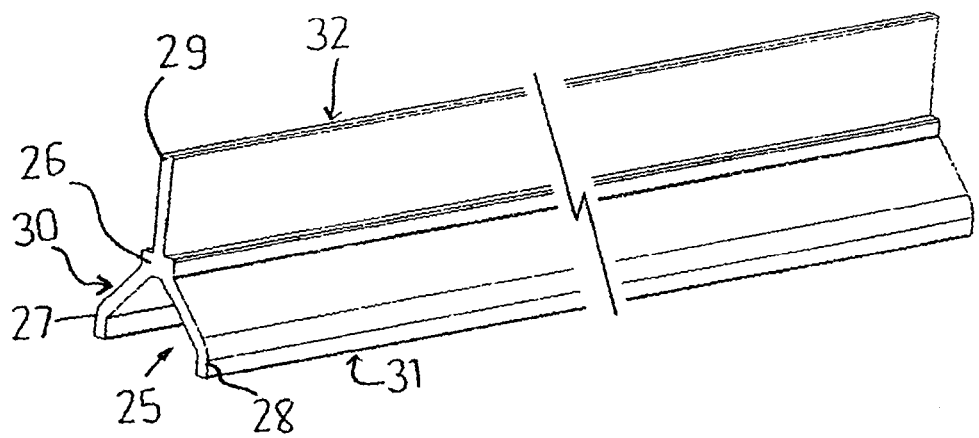
FIG. 8 is a perspective view of the strips of the post of FIG. 6 when joined together.

Referring now to FIGS. 6-8, there is shown a furcated composite post 25 according to an embodiment of the present invention. The post 25 has a spine 26 (see FIG. 8), a longitudinal axis extending along the spine 26 and three arms 27, 28, 29 that extend along a length of the spine 26 and generally radially from the spine 26. The arms 27 and 28 extend from the spine 26 at approximately 100-120 degrees relative to one another. Opposed longitudinal ends of arms 27, 28 are bent such that they extended non-radially and parallel with arm 29, and provide the post 25 with additional strength.

Arm 29 may have openings spaced along a length of the arm 29 for retaining fencing wires and other types of fencing members (see FIG. 20). Although not shown in the figures, a ground anchoring end of the post 25 may be pointed (as seen in FIG. 20).

FIG. 6 shows that the post 25 is manufactured from three separate steel strips 30, 31, 32 that are welded together. Strip 30 provides arm 27, strip 31 provides arm 28, and strip 32 provides arm 29. Longitudinal ends of arms 27 and 28 are welded to a longitudinal end of arm 29 along the spine 26. (The weld seam has not been labelled.)

In order to manufacture post 25, steel strips 30 and 31 (each about 10-40 mm wide and about 2-5 mm thick) are unspooled from a pair of coil dispensers at an identical set rate, and fed to sets of working rolls of the mill until the desired profiles are achieved.

Strip 32 is unspooled from a coil dispenser at the same set rate and together with strips 30 and 31 is fed through a set of positioning rolls of the roll mill such that the strips 30, 31, 32 are held in a correct orientation for welding. The strips 30, 31, 32 are then welded together either manually or using an automated welding station.

The welded strips 30, 31, 32 are then processed into posts 25 as described for post 1.

Figure 9:
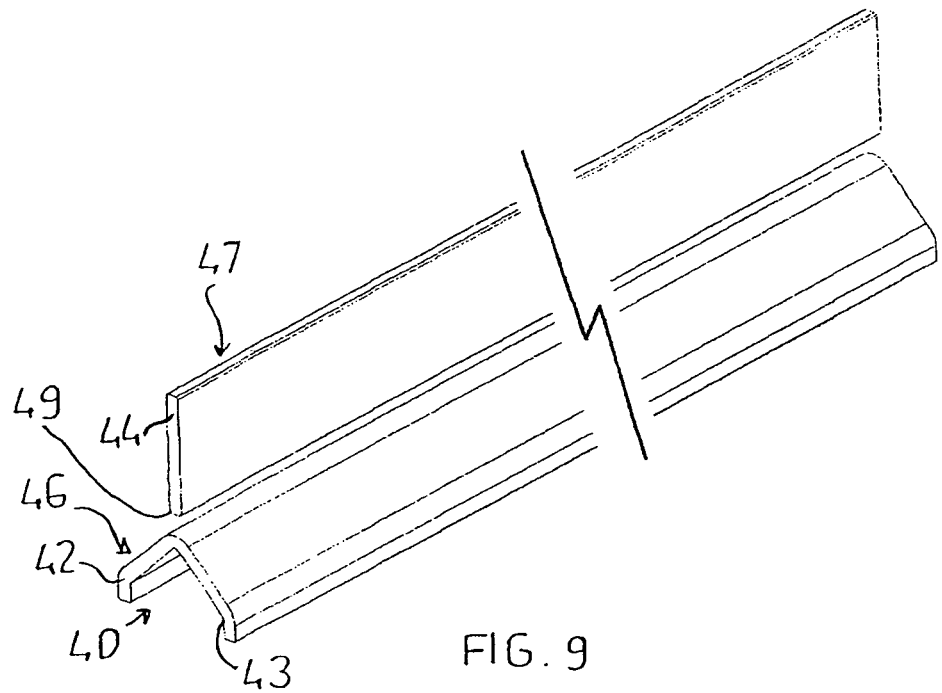
FIG. 9 is a perspective view of two separate strips of a furcated composite post (of indefinite length), according to another embodiment of the present invention.
Figure 10:
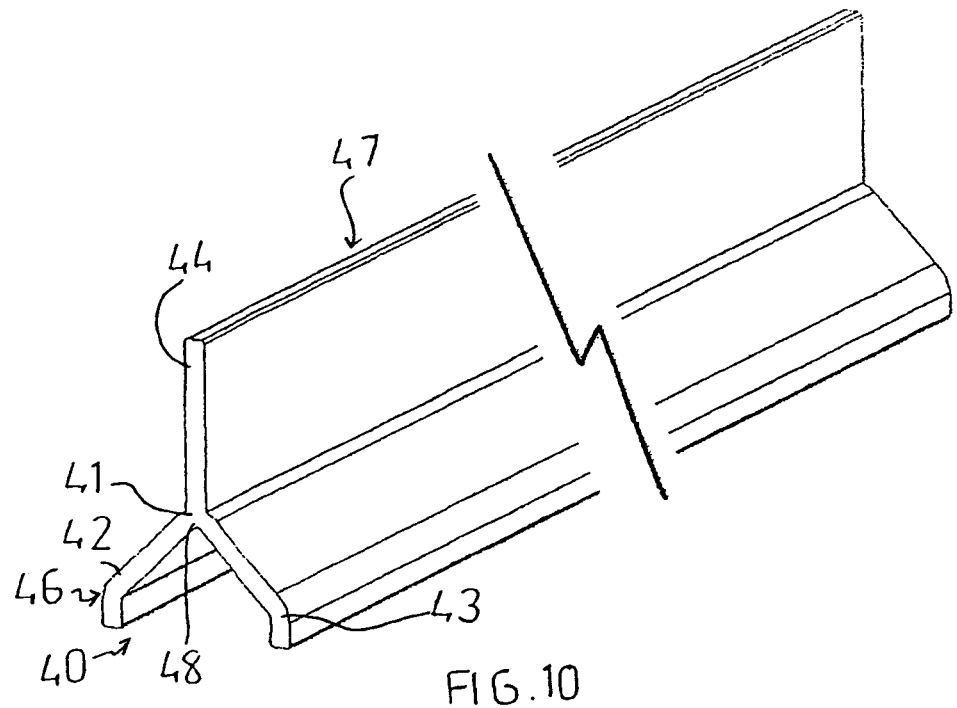
FIG. 10 is a perspective view of the strips of the post of FIG. 9 when joined together.

Referring now to FIGS. 9 and 10, there is shown a furcated composite post 40 according to an embodiment of the present invention. The post 40 has a spine 41 (see FIG. 10), a longitudinal axis extending along the spine 41 and three arms 42, 43, 44 that extend along a length of the spine 41 and generally radially from the spine 41. The arms 42 and 43 extend from the spine 41 at approximately 100-120 degrees relative to one another. Longitudinal free ends of arms 42 and 43 are bent such that they extended non-radially and substantially parallel with arm 44 (although they could be bent at any other suitable angle), and provide the post 40 with additional strength. Arm 44 may have openings spaced along a length of the arm 40 for retaining fencing wires and other types of fencing members (see FIG. 20). Although not shown in the figures, a ground anchoring end of the post 40 may be pointed (as seen in FIG. 20).

FIGS. 9 and 10 shows that the post 40 is manufactured from two separate steel strips 46, 47 that are welded together. Strip 46 provides a bend 48 and arms 42 and 43 extend from each side of the bend 48. Strip 47 provides arm 44. A longitudinal end 49 of arm 44 is welded to the bend 48 along the spine 41. (The weld seam has not been labelled.)

Figure 21:
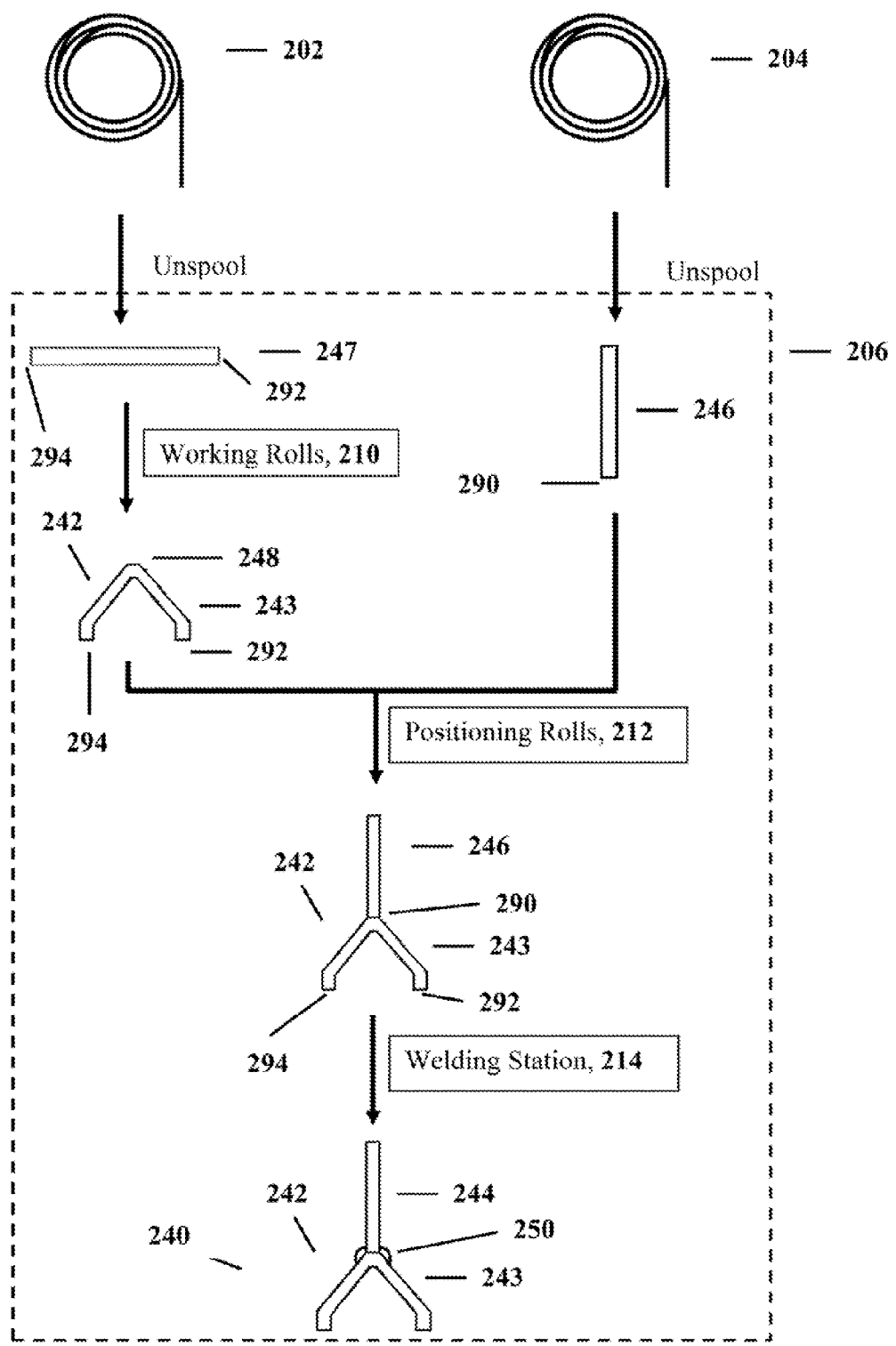
FIG. 21 is a schematic showing manufacture the post of FIG. 10.

Manufacture of the post shown in FIG. 10 is illustrated in FIG. 21. First, steel strips are provided on coil dispensers 202, 204. A first strip 246 having a longitudinal end 290 and a second strip 247 having opposed longitudinal ends 292, 294 are unspooled at the same set rate from coil dispensers 202, 204 to a roll mill 206. The second strip 247 is fed to one or more sets of working rolls 210 of the roll mill 206, until strip 247 is provided with a bend 248 between ends 292, 294, and arms 242 and 243 extending from each side of the bend 248. The first and second steel strips 246, 247 are then fed at the same set rate to positioning rolls 212 of the roll mill 206 so that the strips 246, 247 may be held m a Correct orientation for welding. The strips 246, 247 are then welded together manually or automatically at a welding station 214 situated at positioning rolls 212. in welding the strips 246, 247 together, a weld seam 250 is formed (exaggerated in FIG. 21). This provides a post 240 with three arms 242, 243, 244.

Post 40 can be manufactured as described above for post 1.

Figure 13:
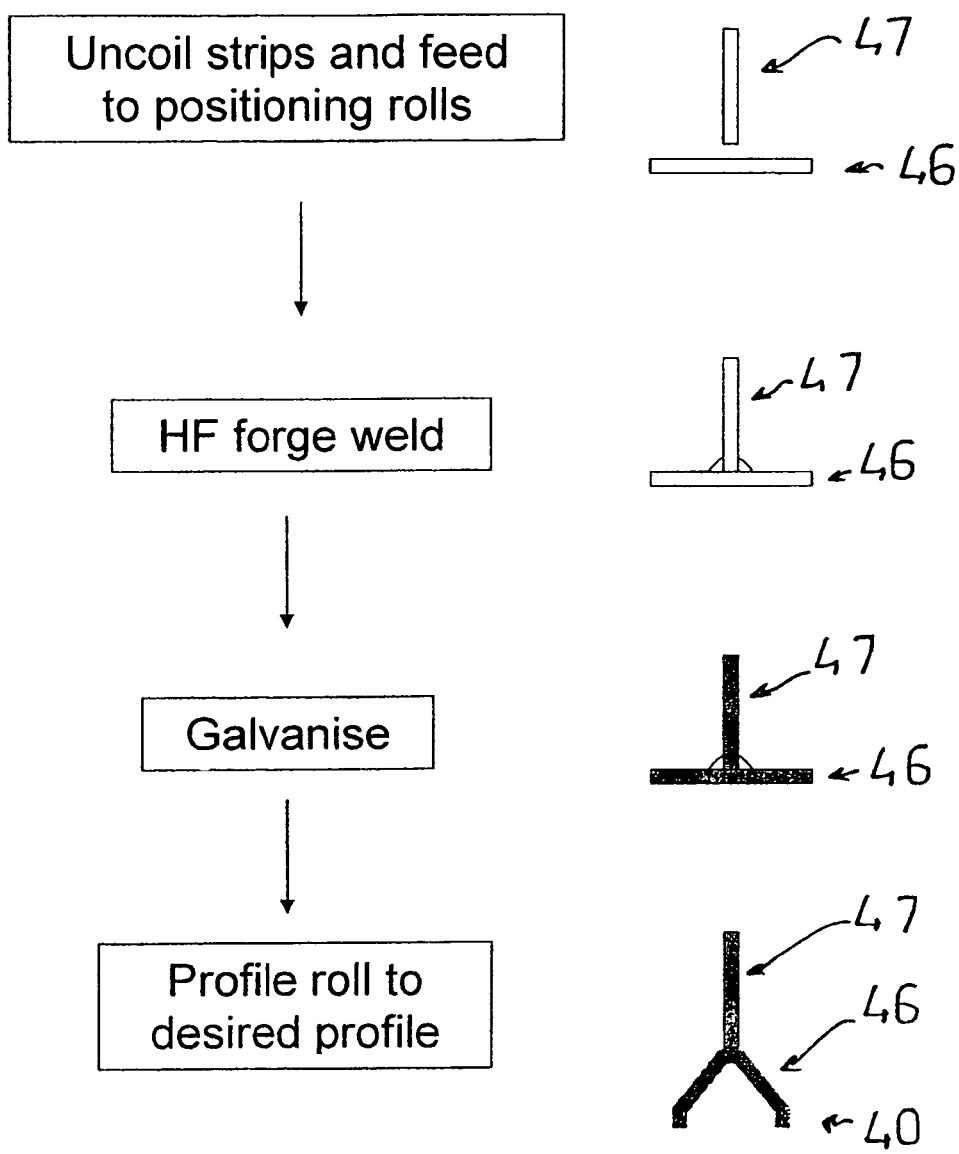
FIG. 13 is a schematic showing steps for manufacturing a furcated composite post, according to an embodiment of the present invention.
Figure 14:
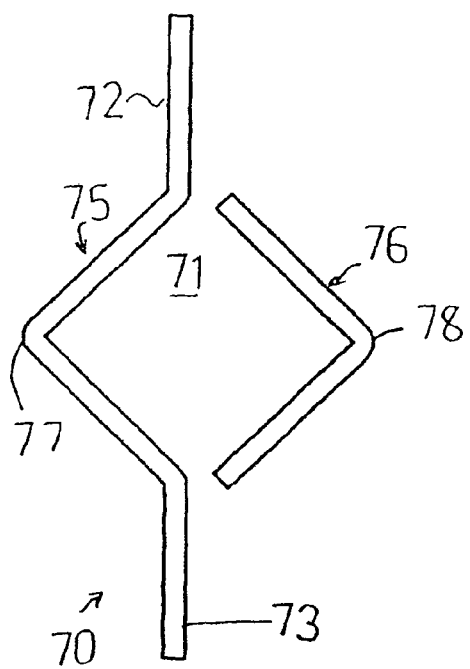
FIG. 14 is an end view of two separate strips of a furcated composite post, according to an embodiment of the present invention.
Figure 15:
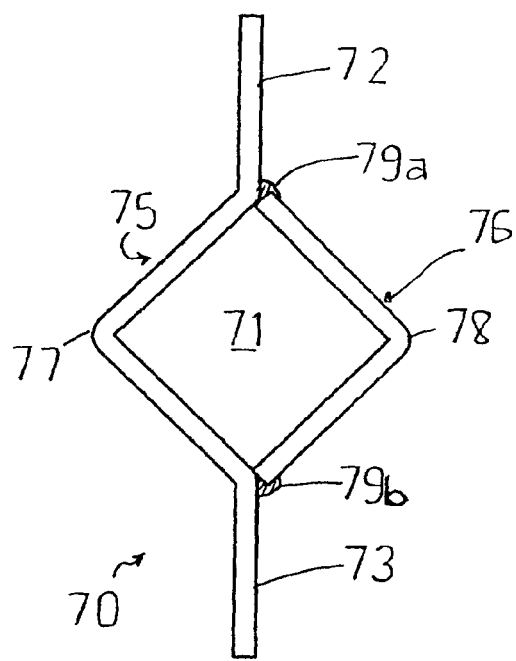
FIG. 15 is the same as FIG. 14 but showing in detail the strips joined together.
Figure 16:
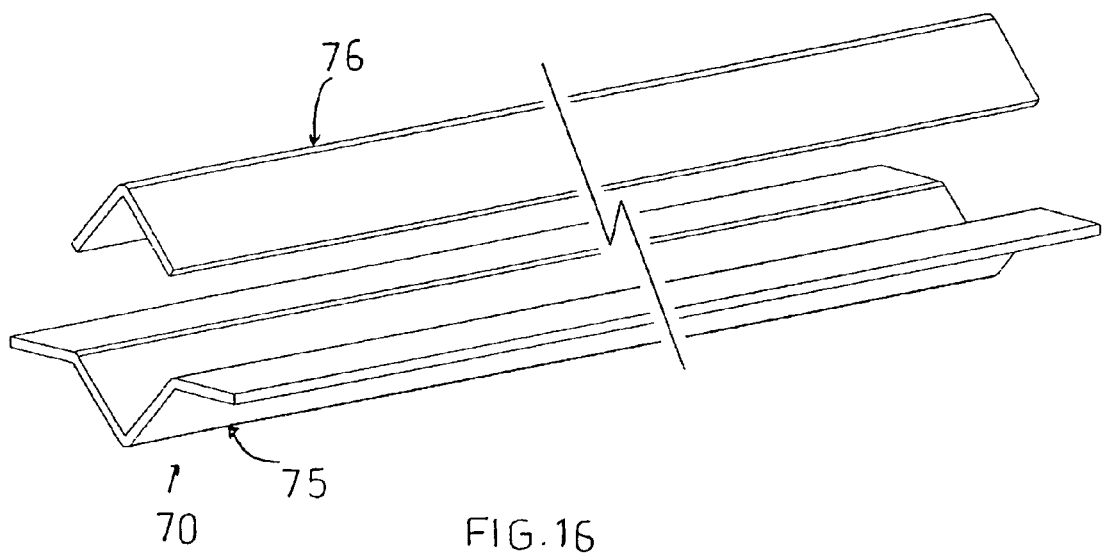
FIG. 16 is a perspective view of the post (of indefinite length) shown in FIG. 14.
Figure 17:
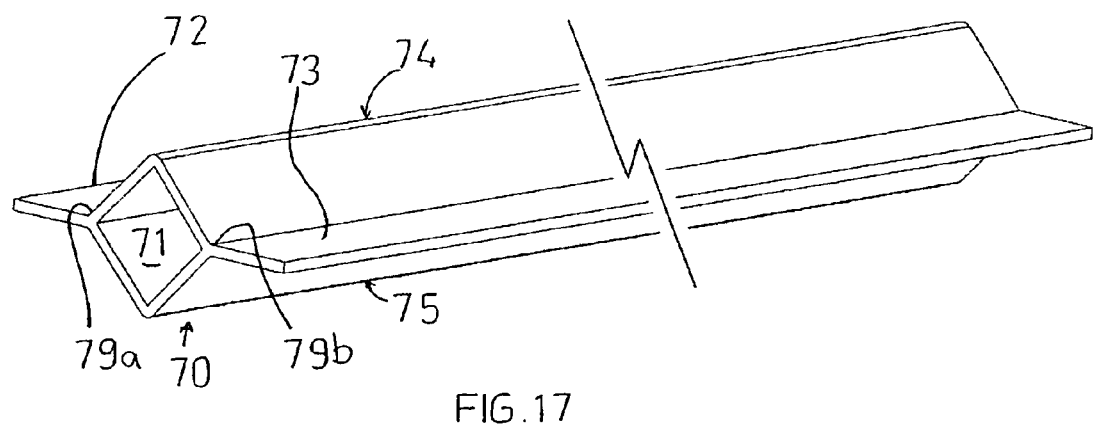
FIG. 17 is a perspective view of the post shown in FIG. 15.

FIG. 13 shows the steps of a preferred method for manufacturing post 40. The steps include: uncoiling strips 46, 47 and feeding them to positioning rolls of a roll mill; HF forge welding the strips 46, 47 together; galvanising the strips 46, 47; and profile rolling strip 46 to the desired cross section.

Figure 11:
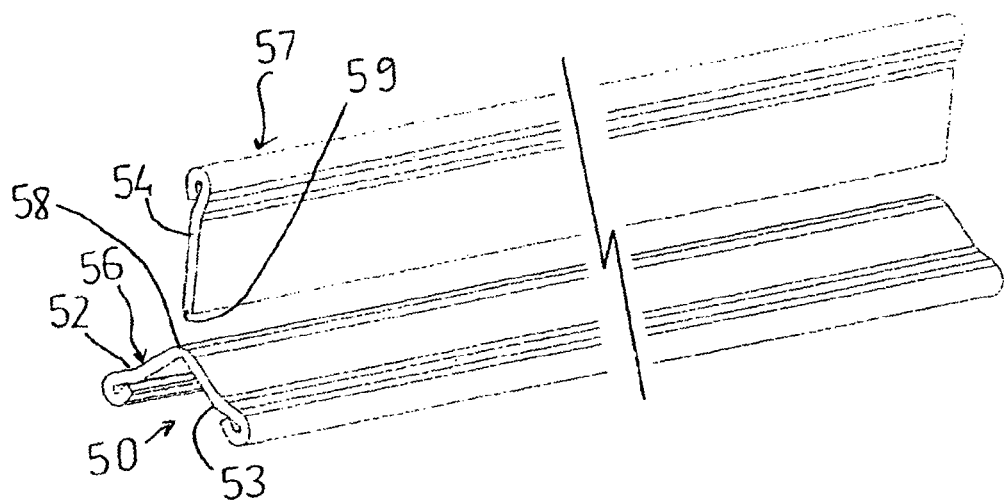
FIG. 11 is a perspective view of two separate strips of a furcated composite post (of indefinite length), according to another embodiment of the present invention.
Figure 12:
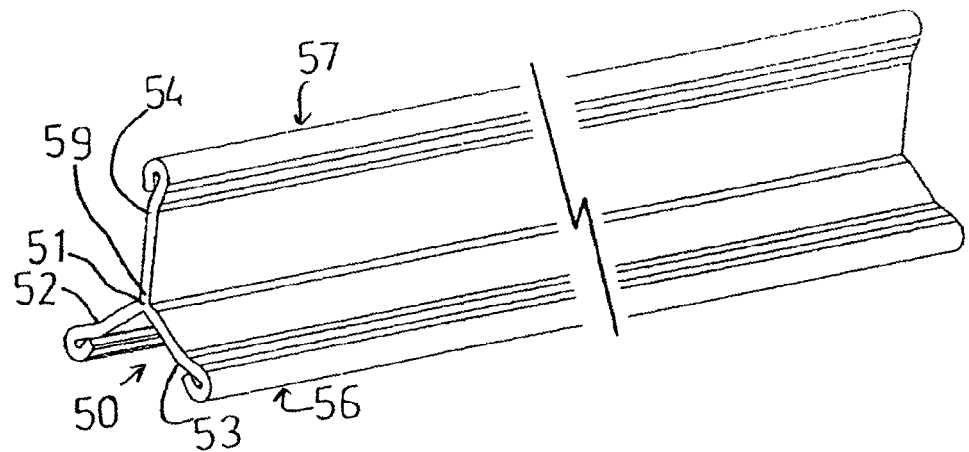
FIG. 12 is a perspective view of the strips of the post of FIG. 11 when joined together.

Referring now to FIGS. 11 and 12, there is shown a furcated composite post 50 according to an embodiment of the present invention. The post 50 has a spine 51 (see FIG. 12), a longitudinal axis extending along the spine 51 and three arms 52, 53, 54 that extend along a length of the spine 51 and generally radially from the spine 51. Arms 52 and 53 extend from the spine 51 at approximately 100-120 degrees relative to one another. Longitudinal free ends of arms 52, 53 and 54 are rolled-over and provide the post 50 with additional strength. Arm 54 may have openings spaced along a length of the arm 54 for retaining fencing wires and other types of fencing members (see FIG. 20). Although not shown in the figures, a ground anchoring end of the post 50 may be pointed (as seen in FIG. 20).

FIG. 11 shows that the post 50 is manufactured from two separate steel strips 56, 57 that are welded together. Strip 56 provides a bend 58, and arms 52 and 53 extend from each side of the bend 58. Strip 57 provides arm 54. A longitudinal end 59 of arm 54 is welded to the bend 58 along the spine 51. (The weld seam has not been labelled.)

In order to manufacture post 50, steel strip 56 (about 20-80 mm wide and about 2-5 mm thick) is unspooled from a coil dispenser at a set rate, and fed through working rolls of a progressive cold roll mill to form the bend 58 and the rolled-over ends.

Steel strip 57 (about 10-80 mm wide and about 2-5 mm thick) is unspooled from a coil dispenser at the same set rate as strip 56 and fed through working rolls of the progressive cold roll mill to form the rolled-over end.

Strips 56 and 57 are then fed through a set of positioning rolls of the roll mill such that they are held in a correct orientation for welding. The strips 56, 57 are then welded together.

Referring now to FIGS. 14-17, there is shown a furcated composite post 70 according to an embodiment of the present invention. The post 70 has a longitudinal axis, a tube 71 extending along the longitudinal axis, and two arms 72, 73 that extend along a length of the tube 71 and generally radially from the tube 71. The tube 71 is of rectangular profile, and arms 72 and 73 extend from opposed corners of the tube 71.

The arms 72, 73 have openings spaced along their lengths for retaining fencing wires and other types of fencing members (see FIG. 20). Although not shown in the figures, a ground anchoring end of the post 70 may be pointed (as seen in FIG. 20).

The post 70 is manufactured from two, separate steel strips 75, 76 that are welded together. Strip 75 provides a bend/corner 77 of the tube 71 as well as two sides of the tube 71. Strip 75 further provides arms 72 and 73. Strip 76 provides another bend/corner 78 of the tube 71 as well as two other sides of the tube 71. Arms 72 and 73 extend from opposing corners of the tube 71. Longitudinal ends of strip 76 are welded to bends of strip 75. The weld seams are labelled 79a and 79b in FIG. 15.

Manufacture of post 70 involves cold profile rolling strips 75 and 76 (about 40-200 mm wide and about 2-5 mm thick) using a roll mill and welding as described above.

The post 70 may be further processed by way of being cut to produce a ground anchoring point. The post 70 may be hole- or slot-punched using a punch of the roll mill. The post 70 may be subjected to anti-corrosion techniques (eg. coated, plated, anodised etc).

Figure 18:
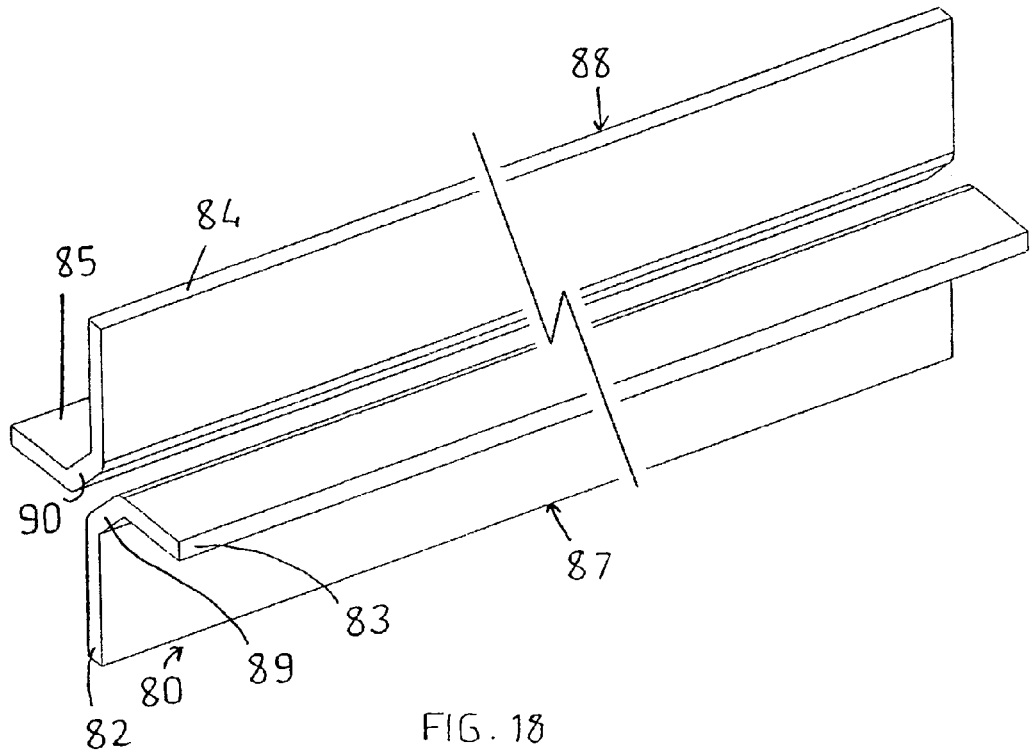
FIG. 18 is a perspective view of two separate strips of a furcated composite post (of indefinite length), according to another embodiment of the present invention.
Figure 19:
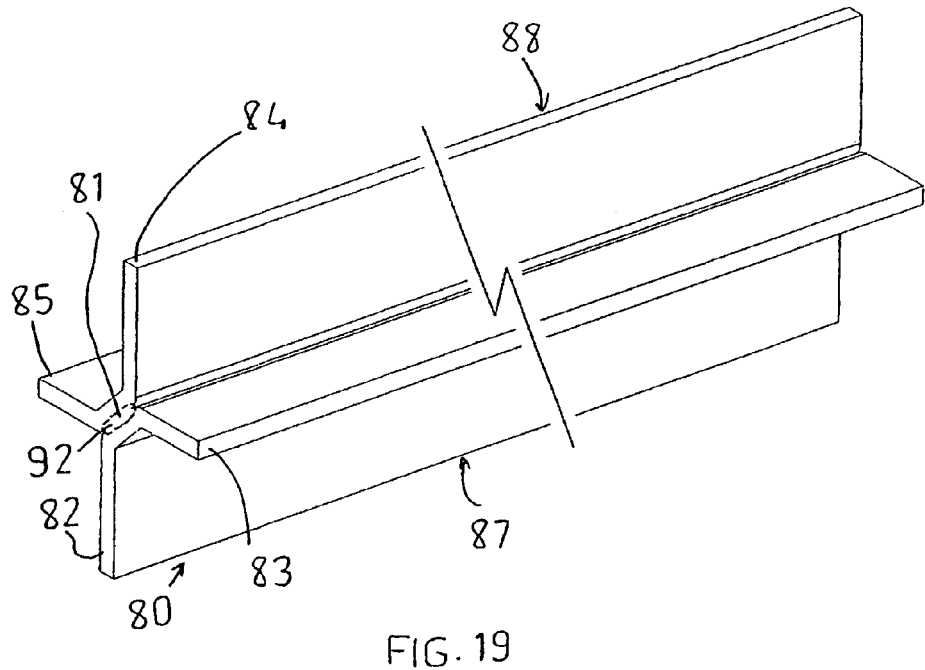
FIG. 19 is a perspective view of the strips of the post of FIG. 18 when joined together.

Referring now to FIGS. 18 and 19, there is shown a furcated composite post 80 according to an embodiment of the present invention. The post 80 has a spine 81, a longitudinal axis extending along the spine 81, and four arms 82, 83, 84, 85 that extend along a length of the spine 81 and generally radially from the spine 81. At least one of the arms 82, 83, 84, 85 has openings spaced along its length for retaining fencing wires and other types of fencing members (see FIG. 20). Although not shown in the figures, a ground anchoring end of the post 80 may be pointed (as seen in FIG. 20).

FIG. 18 shows that the post 80 is manufactured from two separate steel strips 87, 88 that are welded together. Strip 87 provides a bend 89, and arms 82 and 83 extend from each side of the bend 89. Strip 88 also provides a bend 90, and arms 84 and 85 extend from each side of the bend 90. The bends 89, 90 are welded together to form the spine 81. The weld seam is labelled numeral 92 in FIG. 19.

Manufacture of post 80 involves cold profile rolling strips 87 and 88 (about 40-200 mm wide and about 2-5 mm thick) using a roll mill and welding as described above.

The post 80 may be further processed by way of being cut to produce a ground anchoring point. The post 80 may be hole- or slot-punched using a punch of the roll mill. The post 80 may be subjected to anti-corrosion techniques (eg. coated, plated, anodised etc).

As mentioned, FIG. 20 is a general representation of a post 100 like that of any one of FIGS. 1-12 and FIGS. 14-19, showing what types of openings 101-105 one or more arms 107 of the post 100 may have, and also showing a pointed ground anchoring end 108.

FIG. 20 also shows a keeper/retainer assembly 120 pivotally mounted to a post arm 107 that can pivot between fencing member holding and release positions. The retainer 120 comprises a post mounting region 121, a fencing member engaging region 122 and a counter-balance region 123. A travel stop pin 124 extends laterally of the fence post arm 107 adjacent the counter-balance region 123. A pivot pin 125 extends through the post arm 107 and mounting region 121, and enables the fencing member engaging region 122 to pivot relative to the post arm 107. The fencing member engaging 122 region has a tapered nose that is shaped to both allow a fencing member to locate within a blind end 127 of the slot opening 101 and to be retained within the blind end 127. Keeper/retainer assemblies like retainer assembly 120 are described in greater detail in the applicants' co-pending applications numbered PCT/AU2008/000856, PCT/AU2008/000857 and PCT/AU2009/001316—the entire contents of which are incorporated herein by cross-reference.

The advantages of the present invention include that:
posts can be readily and cost effectively produced from coil strip/sheet metal by profile rolling;
pre-galvanised strips or stainless steel can be used, which may be a cheaper option than galvanising the post after roll forming;
the strength to weight property of the post is more effective than that produced by traditional rolling;
many different types of post profiles/cross sections can be really produced; and
punching and cutting operations may be incorporated prior to, during or after roll forming.

The foregoing embodiments are illustrative only of the principles of the invention, and various modifications and changes will readily occur to those skilled in the art. The invention is capable of being practiced and carried out in various ways and in other embodiments. It is also to be understood that the terminology employed herein is for the purpose of description and should not be regarded as limiting.

The term "comprise" and variants of the term such as "comprises" or "comprising" are used herein to denote the inclusion of a stated-integer or stated integers but not to exclude any other integer or any other integers, unless in the context or usage an exclusive interpretation of the term is required.

The invention claimed is:

1. A method of manufacturing a furcated composite post, with said post comprising: a longitudinally extending spine; and first, second and third interconnected longitudinal arms, each of which extends along the spine and generally radially from the spine, said method comprising the steps of:
(1) feeding:
a first strip having an end region including: two side walls substantially parallel to each other and on opposite sides of the first strip, and an end wall substantially perpendicular to the two side walls and between the two side walls; wherein the distance between the two side walls is 1-10 mm; and
a second 1-10 mm thick strip;
to positioning rolls for holding the strips in a correct orientation for welding; and
(2) welding substantially only the end wall of the first strip to the second strip to form a longitudinally extending weld seam along the spine of the post, such that the first strip provides the first arm of the post, and the second strip provides the second and third arms of the post;
the method further comprising the step of:
i) feeding at least one of the first strip and the second strip to working rolls of a roll mill for profile rolling to a desired cross sectional profile;
wherein step i) is performed either before step (1) or after step (2).

2. The method of claim 1, further comprising a step selected from the group consisting of cutting the post to a desired length or for forming a pointed ground anchoring end, installing one or more openings in at least one arm of the post for retaining a fencing member, and treating the strips or post so as to reduce or prevent corrosion.

3. The method of claim 1, wherein the post manufactured by the method is substantially T-shaped or Y-shaped when viewed on end.

4. The method of claim 1, wherein at least one of the first, second, and third arms of said post manufactured by the method has a fold, rib, bend or a rolled-over longitudinal end to help the post resist bending when being driven into the ground or when being forced from a normal attitude.

5. The method of claim 1, wherein at least one of the first, second, and third arms of said post manufactured by the method has one or more openings or retainers spaced along a length of the arm adapted to retain a fencing member.

6. The method of claim 1, wherein the step of welding is performed in an automated manner.

7. The method of claim 1, wherein the step of welding is performed at the positioning rolls.

8. The method of claim 1, wherein at least one of the first strip and the second strip is fed from a coil dispenser to said positioning rolls.

9. The method of claim 1, wherein at least one of the first strip and the second strip is fed from a coil dispenser to said working rolls.

10. The method of claim 1, wherein step i) is performed before step (1).

11. The method of claim 1, wherein step i) is performed after step (2).

12. The method of claim 1, wherein the post manufactured by the method is at least 1 m in length.

13. The method of claim 1, wherein the post manufactured by the method is a fence post.

14. The method of claim 1, wherein the post manufactured by the method is substantially Y-shaped when viewed on end, and the angle between two upstretched arms of the Y-shape is between about 80 to 130 degrees.

15. The method of claim 1, wherein the method comprises one or two steps of welding the strips together at the positioning rolls.

16. The method of claim 1, wherein the longitudinal end of the first strip is welded to a longitudinal bend in the second strip.

17. The method of claim 1, wherein the step of welding involves using high-frequency resistance welding.

18. The method of claim 1, wherein the first strip is planar.

* * * * *